No. 635,026. Patented Oct. 17, 1899.
W. E. SAUNDERS.
PRESS FOR FORMING ARTICLES FROM PLASTIC MATERIALS.
(Application filed Feb. 27, 1899.)

(No Model.) 2 Sheets—Sheet 1.

Witnesses
Ernest C. Wilcox.
Lorin Printiss

William E. Saunders Inventor
By his Attorney

No. 635,026. Patented Oct. 17, 1899.
W. E. SAUNDERS.
PRESS FOR FORMING ARTICLES FROM PLASTIC MATERIALS.
(Application filed Feb. 27, 1899.)
(No Model.) 2 Sheets—Sheet 2.
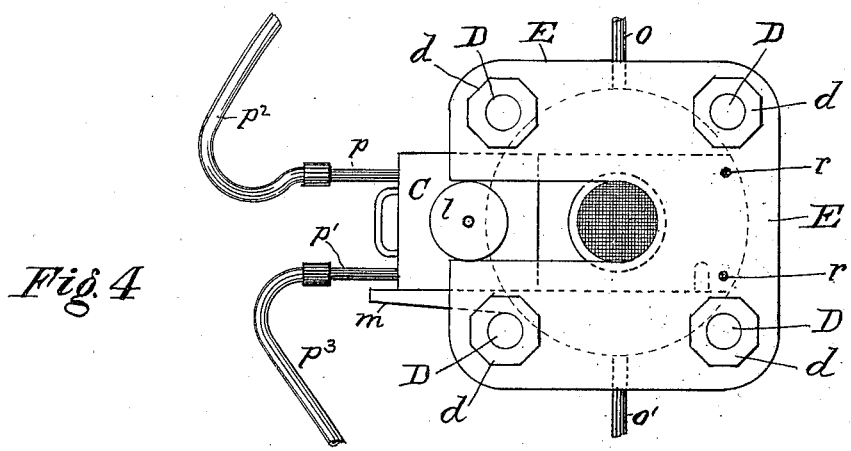
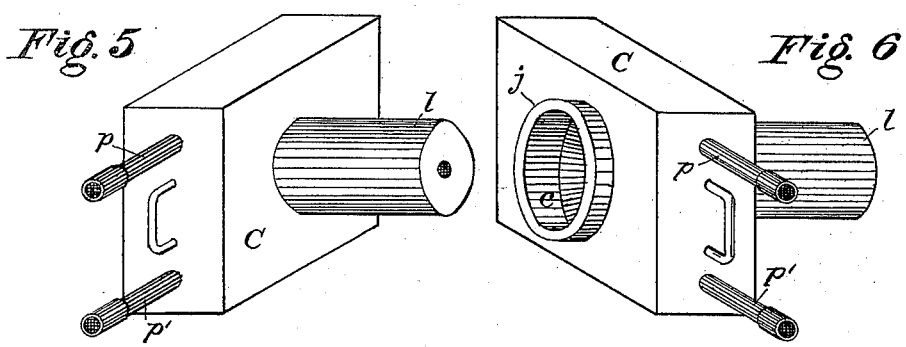
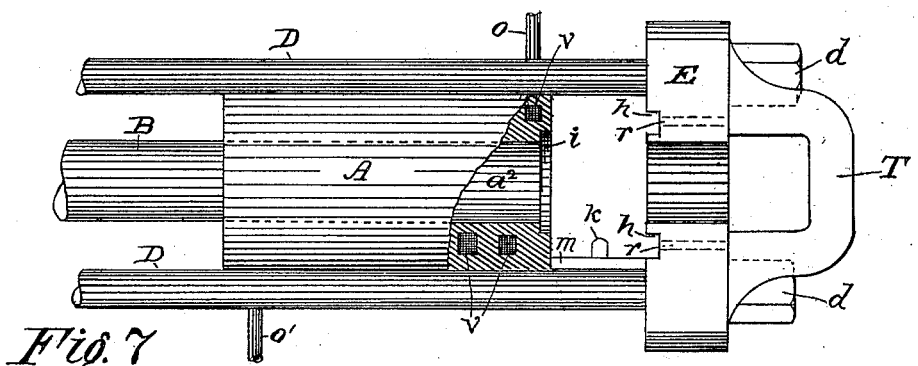
Witnesses
Ernest G. Wilcox.
William E. Saunders, Inventor
By his Attorney

UNITED STATES PATENT OFFICE.

WILLIAM EDWARD SAUNDERS, OF CLEVELAND, OHIO.

PRESS FOR FORMING ARTICLES FROM PLASTIC MATERIALS.

SPECIFICATION forming part of Letters Patent No. 635,026, dated October 17, 1899.

Application filed February 27, 1899. Serial No. 706,923. (No model.)

*To all whom it may concern:*

Be it known that I, WILLIAM EDWARD SAUNDERS, a citizen of the United States, residing at Cleveland, in the county of Cuyahoga and State of Ohio, have invented certain new and useful Improvements in Presses for Forming Articles from Plastic Materials; and I do hereby declare the following to be a full, clear, and exact description of the invention, such as will enable others skilled in the art to which it appertains to make and use the same.

My invention relates to improvements in presses for forming articles from plastic materials; and it consists in an improved construction, combination, and arrangement of the die-head and die, the object of the invention being to secure increased efficiency of the apparatus.

Figure 1:
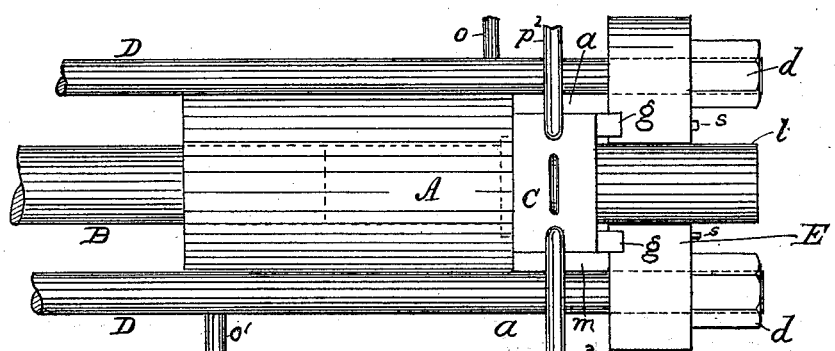
Figure 2:
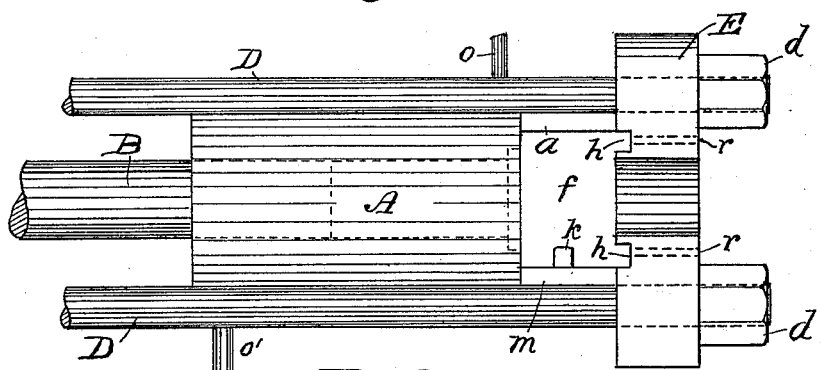
Figure 3:
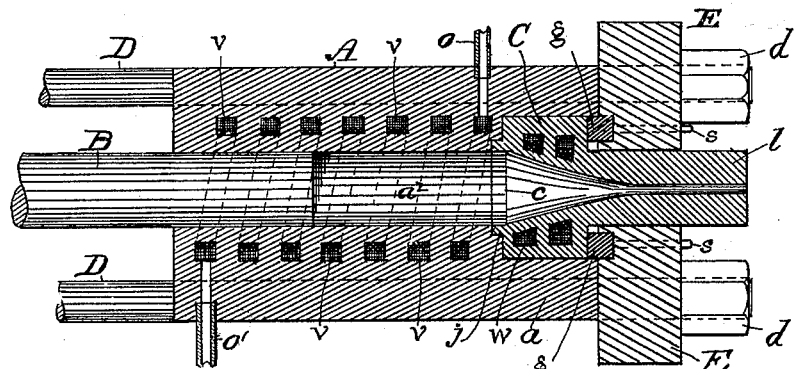

In the drawings, Figure 1 represents in side elevation the die-head and cylinder of a forming-press with the die in place as in operation. Fig. 2 is a like view in elevation of the same parts with the die removed. Fig. 3 is a central vertical section of the parts shown in Fig. 1. Fig. 4 is a front elevation showing the die drawn out for charging the cylinder. Figs. 5 and 6 are perspective views of the die, showing, respectively, the front and rear sides; and Fig. 7 is a side view in elevation of the same parts shown in Fig. 2, exhibiting a modification of the construction.

A represents the press-cylinder, in which the plastic material is placed; B, the plunger fitting the cylinder and which when driven forward forces the plastic material out through the die C.

D D are heavy stay-rods which by means of nuts $d$ $d$ or equivalent means support the thrust-plate E against the heavy pressure of the press.

The front part $a$ of cylinder A is cut away to afford the die-seat $f$, as shown in Fig. 2, or space for the die is left between the front end of cylinder A and the plate E, as shown in Fig. 7, these parts constituting the die-head. The die when in place is forced firmly against the front of cylinder A by wedges $g$ $g$, driven in wedge-seats $h$ $h$, formed in the rear side of the thrust-plate E, which forms the front side of the die-seat. In the front end of the chamber $a^2$ of cylinder A is formed a recess $i$, (shown in Fig. 7 and in dotted lines in Figs. 1 and 2,) and a shoulder or projection $j$ on the back of die C fits into this recess when the die is in place. A stop $k$ at the back of die-seat $f$ insures that the die when pushed in shall register exactly with the cylinder A, and the driving in of wedges $g$ forces the shoulder $j$ into recess $i$, so that the chamber $c$ of the die exactly registers with the chamber $a^2$ of cylinder A. At the rear side of the die its chamber $c$ is of the full diameter of that of chamber $a^2$, and the piston or plunger B is given sufficient throw to pass beyond chamber $a^2$ and project slightly into the chamber of die C, the result of which is that every particle of the material is forced out of the cylinder, and when the plunger is retracted and the die removed the interior of cylinder A is empty and clean, no remnants of the charge of material being left therein, as is usually the case. When the die is in place and the wedges $g$ driven home, the cylinder, die, and plate E are practically a solid structure, and the entire strain of the very heavy pressure on plunger B is transmitted to and sustained by the stay-rods D D.

The die C has on its front side a projection $l$, in which the cavity $c$ of the die is contracted to the size and form of the finished article and from which the plastic material is forced in its completed form as a continuous mass, which is cut into suitable lengths in any common and usual manner. To admit the projection $l$, the plate E is cut away on the side from which the die is inserted, as shown in Fig. 4, and to support the die when drawn out a table or bracket $m$ is affixed to the die-head, its top being exactly level with the bottom of the die-seat $f$, as shown. When the die is drawn out of its seat, as in Fig. 4, the cylinder is filled with previously-formed plugs of the plastic material. The die is then slid back into its seat against the stop $k$, the wedges $g$ are driven into their seats, and the press is ready for operation. When the plunger has completed its travel, the wedges are driven out, the die is forced forward and drawn out, the plunger retracted, the cylinder refilled, and the operation again proceeded with.

To prevent the plastic material chilling or hardening in the cylinder A, the latter is provided with a steam-jacket $v$, to which inlet-pipe o and outlet-pipe o' are connected. For the purpose of heating the die and keeping the material warm the die C is also provided with a steam channel or channels w around the cavity c, and inlet-pipe p and outlet-pipe p' are connected thereto and provided with flexible steam-hose connections $p^2$ $p^3$ to suitable steam supply and exhaust, respectively.

The wedges g g are subjected to enormous pressure and are made with slight taper to render them less liable to be forced out by the pressure; but as a positive precaution against their accidental displacement I prefer to provide holes r (see Fig. 4) in the plate E and to insert pins s therein, which abut against the ends of the wedges and prevent their moving in their seats. When the wedges are to be removed, the pins are easily driven out of the holes r, and the wedges can then easily be driven out to release the die.

Heretofore the dies of presses of this class have been secured in the die-head by means of screws or threaded parts, and the enormous pressure used, amounting sometimes to many tons, causes the threaded parts to be so tightly jammed that very great difficulty has been found in releasing the die, and great power, as well as much time, is required in effecting it. By my above-described device threaded parts are obviated, time is saved, and the wedges are always easily removed, as the force applied to drive them out acts in the same direction as the resultant of the pressure exerted on them by the die.

For the purpose of strengthening the plate E on the side where it is recessed to receive the projection l of die C, should it be deemed necessary, a bridge T may be made to connect the parts of plate E above and below the opening through which the projection l passes, as shown in Fig. 7, being extended sufficiently to allow the projection l to pass through. This will prevent any possible tendency of the heavy pressure to distort the plate E on the side where it is cut away.

By the terms "front" and "forward" as used in the foregoing specification I mean the side or direction which faces in the same direction as the material moves in passing through the die, and by the terms "back" and "rear" is meant exactly the reverse.

What I claim as my invention, and desire to secure by Letters Patent, is—

1. In a press for forming articles from plastic materials, the combination of a cylinder having a die-seat at its forward end, a thrust-plate closing the front side of said die-seat, a die fitting in said seat, and wedges adapted to be driven between the die and thrust-plate for forcing the die into rigid engagement with the cylinder, substantially as described.

2. In a press for forming articles from plastic materials, the combination of a cylinder having a die-seat at its forward end, a thrust-plate closing the front side of said die-seat, and having wedge-seats cut in its rear face, a die fitting in said seat, and wedges adapted to be driven between the die and thrust-plate for forcing the die into rigid engagement with the cylinder, substantially as described.

3. In a press for forming articles from plastic materials, the combination of a steam-heated cylinder having a die-seat at its forward end, a thrust-plate closing the front side of said die-seat, a die fitting in said seat, and wedges adapted to be driven between the die and thrust-plate for forcing the die into rigid engagement with the cylinder, substantially as described.

4. In a press for forming articles from plastic materials, the combination of a steam-heated cylinder having a die-seat at its forward end, a thrust-plate closing the front side of said die-seat, a steam-heated die fitting in said seat, and wedges adapted to be driven between the die and thrust-plate for forcing the die into rigid engagement with the cylinder, substantially as described.

5. In a press for forming articles from plastic materials, the combination of a steam-heated cylinder having a die-seat at its forward end, a thrust-plate closing the front side of said die-seat, and having wedge-seats cut in its rear face, a die fitting in said seat, and wedges adapted to be driven between the die and thrust-plate for forcing the die into rigid engagement with the cylinder, substantially as described.

6. In a press for forming articles from plastic materials, the combination of a steam-heated cylinder having a die-seat at its forward end, a thrust-plate closing the front side of said die-seat and having wedge-seats cut in its rear face, a steam-heated die fitting in said seat, and wedges adapted to be driven between the die and thrust-plate for forcing the die into rigid engagement with the cylinder, substantially as described.

7. In a press for forming articles from plastic materials, the combination of a cylinder recessed at its front end and having a die-seat at its forward end, a thrust-plate closing the front side of said die-seat, a die fitting in said seat and having a projection on its rear side which fits the recess in the cylinder, and wedges adapted to be driven between the die and thrust-plate for forcing the die rigidly against the cylinder with said recess and projection in engagement, substantially as described.

8. In a press for forming articles from plastic materials, the combination of a cylinder recessed at its front end and having a die-seat at its forward end, a thrust-plate closing the front side of said die-seat and having wedge-seats cut in its rear face, a die fitting in said seat and having a projection on its rear side which fits the recess in the cylinder, and wedges fitting said seats and adapted to be driven between the die and thrust-plate for forcing the die rigidly against the cylinder with said recess and projection in engagement, substantially as described.

9. In a press for forming articles from plastic materials, the combination of a steam-heated cylinder recessed at its front end and having a die-seat at its forward end, a thrust-plate closing the front side of said die-seat, a steam-heated die fitting in said seat and having a projection on its rear side which fits the recess in the cylinder, and wedges adapted to be driven between the die and thrust-plate for forcing the die rigidly against the cylinder with said recess and projection in engagement, substantially as described.

10. In a press for forming articles from plastic materials, the combination of a steam-heated cylinder recessed at its front end and having a die-seat at its forward end, a thrust-plate closing the front side of said die-seat and having wedge-seats cut in its rear face, a steam-heated die fitting in said seat and having a projection on its rear side which fits the recess in the cylinder, and wedges fitting said seats and adapted to be driven between the die and thrust-plate for forcing the die rigidly against the cylinder with said recess and projection in engagement, substantially as described.

11. The combination of a press-cylinder having a die-seat at its forward end, a die fitting said seat and having a forward projection, a thrust-plate closing the front side of said die-seat and cut away to receive the forward projection of the die, and wedges adapted to be driven between the die and thrust-plate for forcing the die into rigid engagement with the cylinder, substantially as described.

12. The combination of a press-cylinder recessed at the front end of its chamber and having a die-seat at its forward end, a die fitting said seat and having on its rear side a projection fitting the recess of the cylinder-chamber and on its front side a forward projection, a thrust-plate closing the front side of said die-seat and cut away to receive the forward projection of the die, and wedges adapted to be driven between the die and thrust-plate for forcing the die into rigid engagement with the cylinder, substantially as described.

13. In combination with the cylinder, die and thrust-plate of a press, the wedges for retaining the die and cylinder in engagement, and removable stops for preventing the loosening of the wedges while under strain, substantially as described.

14. The combination in a press of a cylinder having a die-seat at its forward end, a die fitting in said seat and having a forward-extending projection on its front side, a thrust-plate closing the front side of the die-seat and cut away to receive the projection of the die, wedges adapted to be driven between the die and thrust-plate for forcing the die into rigid engagement with the cylinder, and a bridge-piece spanning the opening in the thrust-plate but permitting the passage of the die, substantially as described.

In testimony whereof I hereto affix my signature in presence of two witnesses.

WILLIAM EDWARD SAUNDERS.

Witnesses:
ALVIN H. GREENE,
ANSON J. MITCHELL.